(12) United States Patent
Brockhoff

(10) Patent No.: US 7,686,377 B2
(45) Date of Patent: Mar. 30, 2010

(54) CONVERTIBLE WITH A ROOF WHICH CAN BE STORED BELOW A COVERING

(75) Inventor: Franz-Ulrich Brockhoff, Bramsche (DE)

(73) Assignee: Wilhelm Karmann GmbH, Osnabruck (DE)

( * ) Notice: Subject to any disclaimer, the term of this patent is extended or adjusted under 35 U.S.C. 154(b) by 281 days.

(21) Appl. No.: 11/916,828

(22) PCT Filed: Jun. 7, 2006

(86) PCT No.: PCT/DE2006/000981

§ 371 (c)(1),
(2), (4) Date: Dec. 7, 2007

(87) PCT Pub. No.: WO2006/131100

PCT Pub. Date: Dec. 14, 2006

(65) Prior Publication Data

US 2008/0197666 A1 Aug. 21, 2008

(30) Foreign Application Priority Data

Jun. 8, 2005 (DE) .................. 10 2005 026 281

(51) Int. Cl.
*B60J 10/10* (2006.01)
(52) U.S. Cl. ............................................. 296/107.08
(58) Field of Classification Search ............ 296/107.08, 296/136.06, 107.01, 107.17, 107.07, 121, 296/108, 107.09
See application file for complete search history.

(56) References Cited

U.S. PATENT DOCUMENTS

| | | | | |
|---|---|---|---|---|
| 5,655,331 A * | 8/1997 | Schrader et al. | ............ | 49/280 |
| 6,092,335 A * | 7/2000 | Queveau et al. | ........ | 296/107.08 |
| 6,186,577 B1 * | 2/2001 | Guckel et al. | .......... | 296/107.08 |
| 6,250,707 B1 * | 6/2001 | Dintner et al. | ......... | 296/107.08 |
| 6,578,899 B2 * | 6/2003 | Hasselgruber et al. | . | 296/107.08 |
| 6,585,307 B1 * | 7/2003 | Queveau et al. | ........ | 296/107.08 |
| 6,604,775 B2 * | 8/2003 | Obendiek | ............. | 296/107.08 |
| 6,705,662 B2 * | 3/2004 | Sande | ................... | 296/107.08 |
| 6,799,788 B2 * | 10/2004 | Plesternings | ........... | 296/107.08 |
| 6,848,736 B2 * | 2/2005 | Guillez | ................... | 296/107.08 |
| 6,899,368 B2 * | 5/2005 | Neubrand | .............. | 296/107.08 |
| 7,000,973 B2 * | 2/2006 | Guillez et al. | .......... | 296/107.08 |
| 2004/0189040 A1 * | 9/2004 | Wojciech et al. | ........... | 296/108 |
| 2004/0222658 A1 | 11/2004 | Dilluvio | | |
| 2006/0186694 A1 | 8/2006 | Wagner | | |
| 2009/0230719 A1 * | 9/2009 | Roeder | .................. | 296/107.08 |

FOREIGN PATENT DOCUMENTS

DE 101 07 079 A1 8/2002
JP 2000211373 A 2/2000

* cited by examiner

*Primary Examiner*—Kiran B. Patel
(74) *Attorney, Agent, or Firm*—Gifford, Krass, Spinkle, Anderson & Citkowski, P.C.

(57) ABSTRACT

A convertible vehicle has a roof that is movable between a closed position extending over the passenger compartment and an opened position stowed in a rearward storage region. A movable cover has a closed position wherein the cover covers the rearward storage area and is movable to a first opened position to provide a passage opening for the roof and to a second opened position to provide a loading opening for baggage. A cover extension has an extended position wherein the cover extension at least partially covers an opening between the movable cover and the passenger.

10 Claims, 18 Drawing Sheets

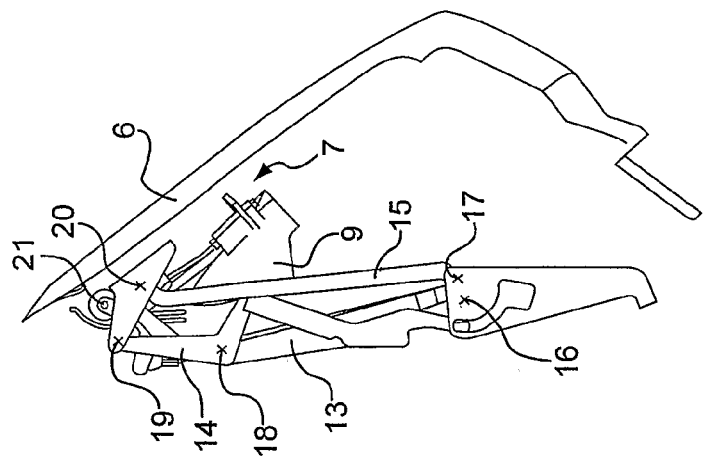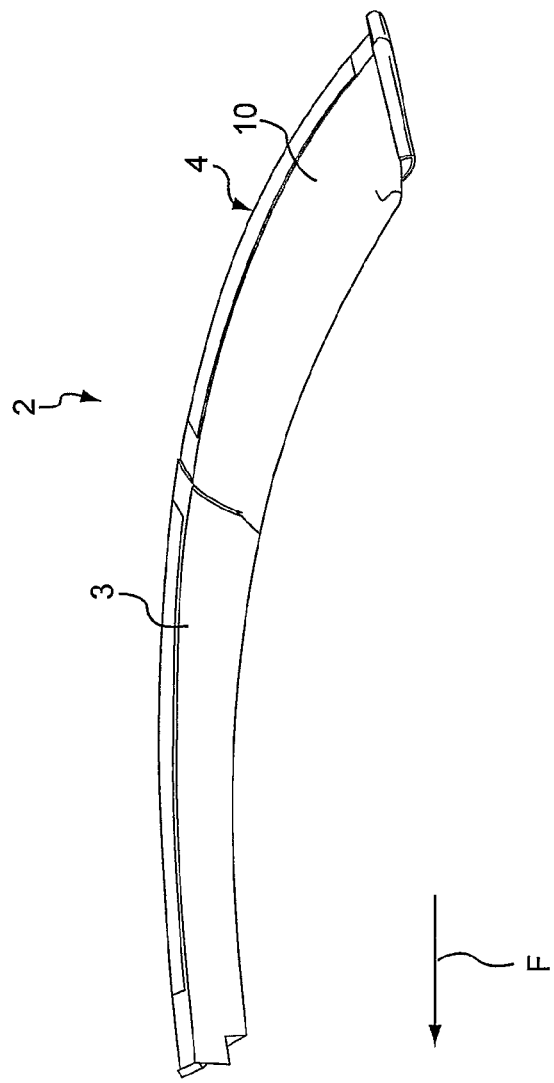
Fig. 3

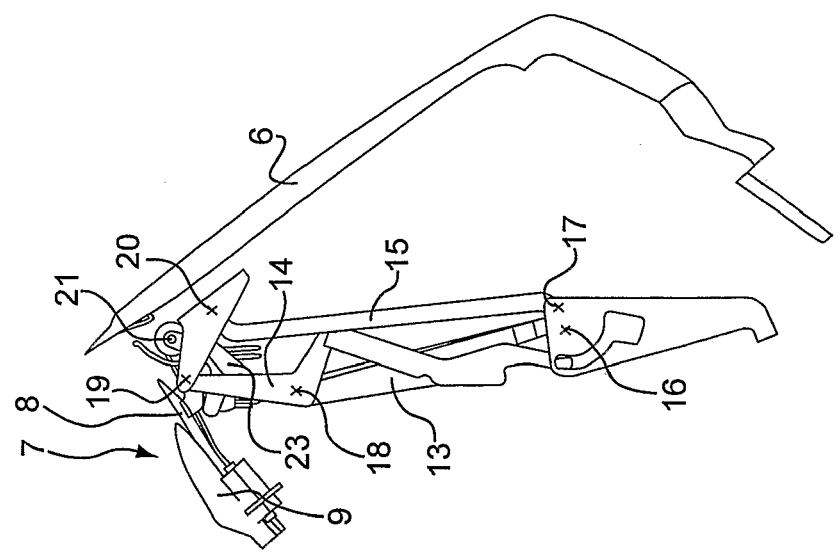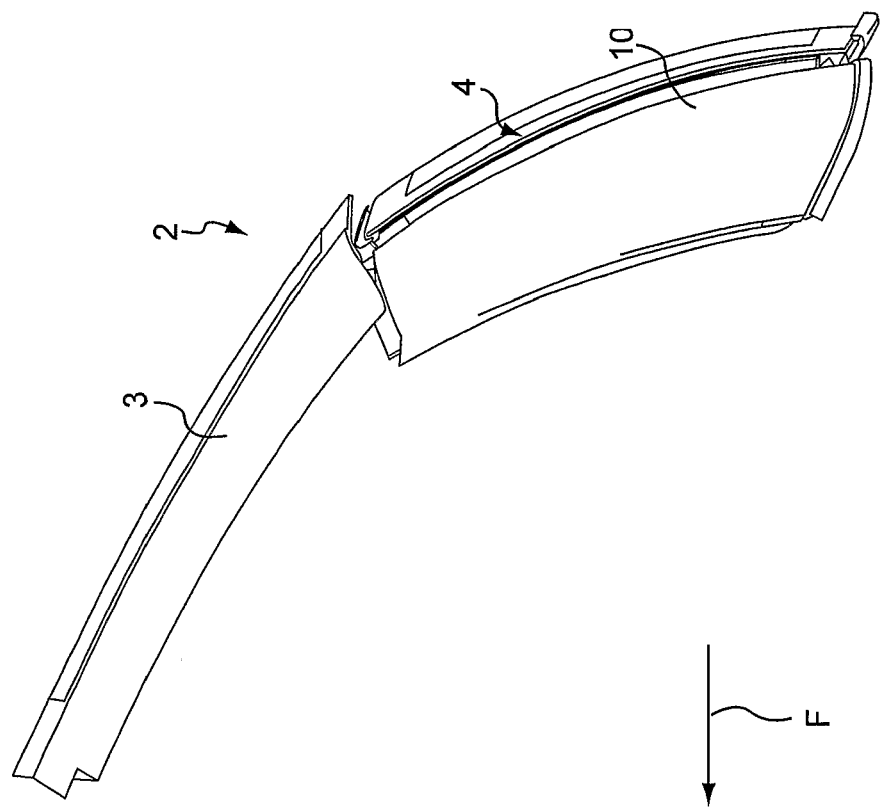

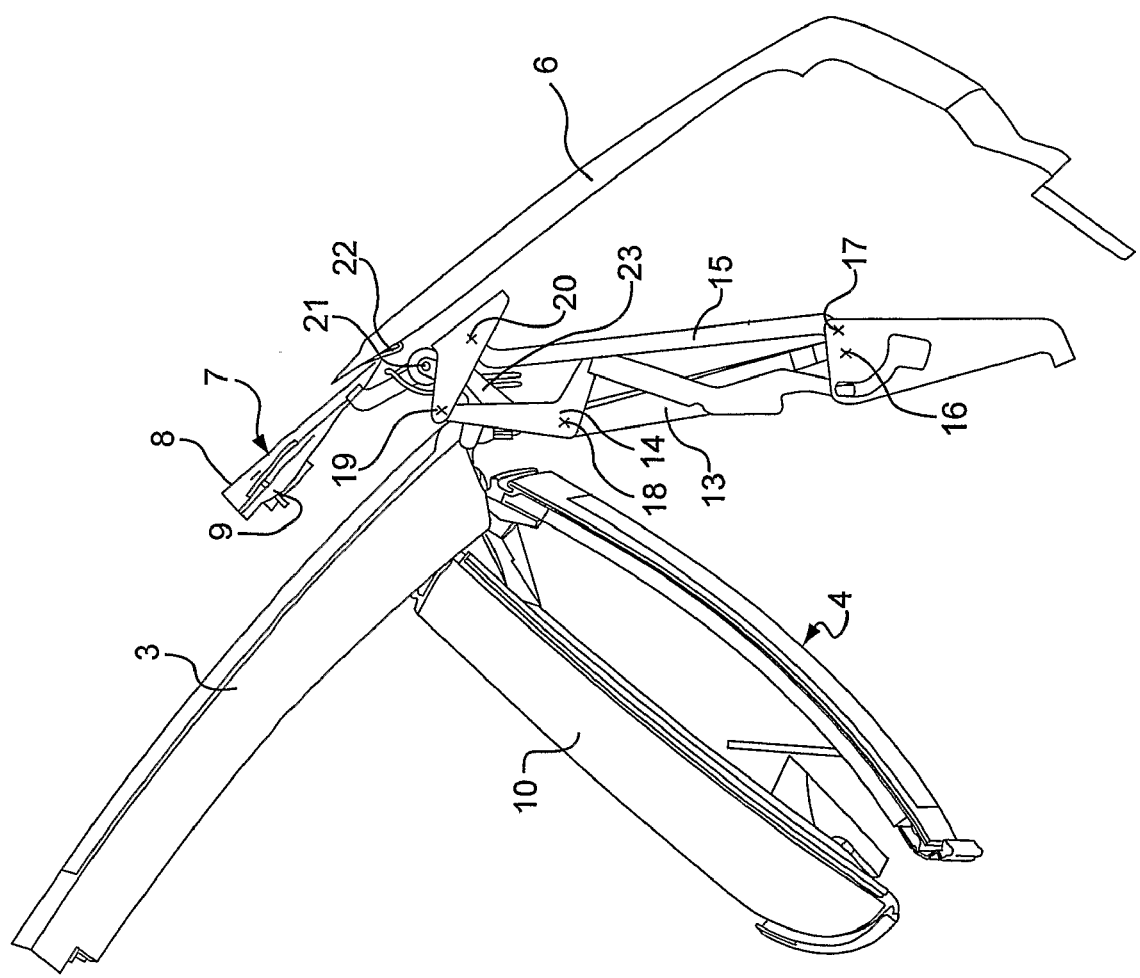

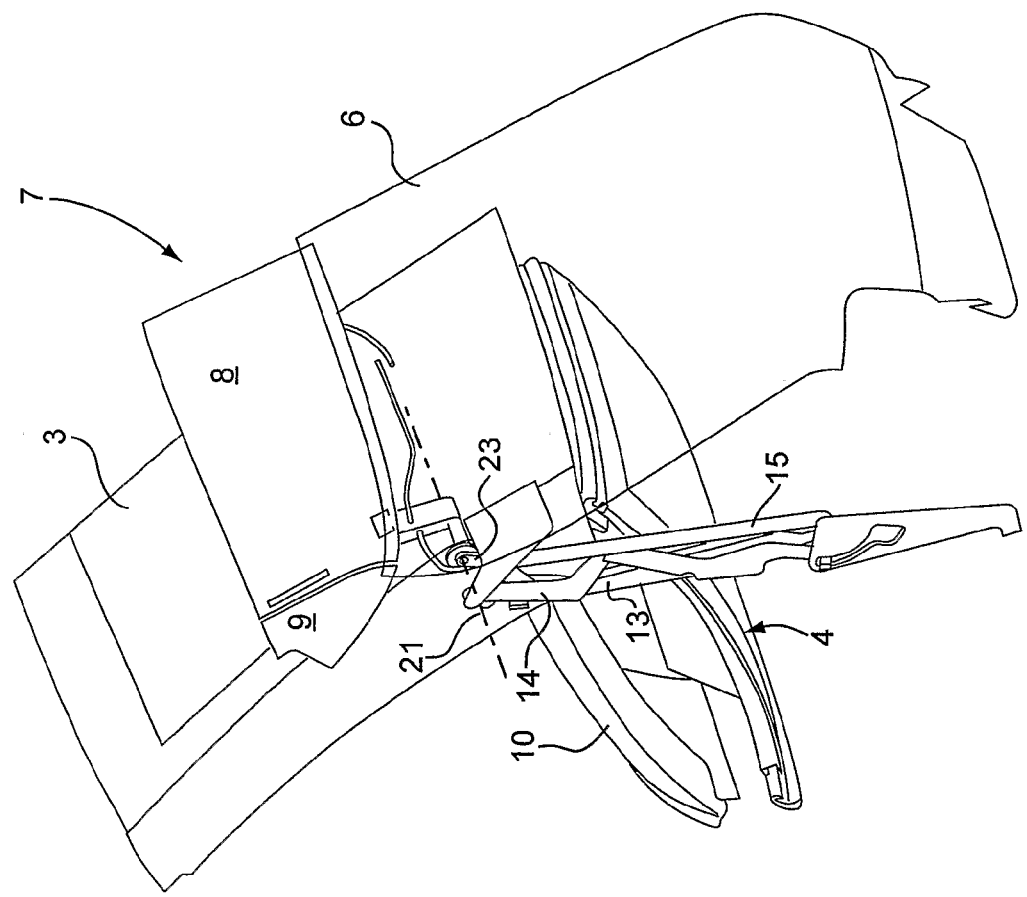
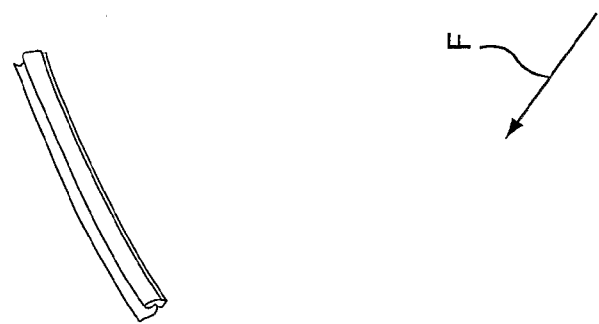
Fig. 13

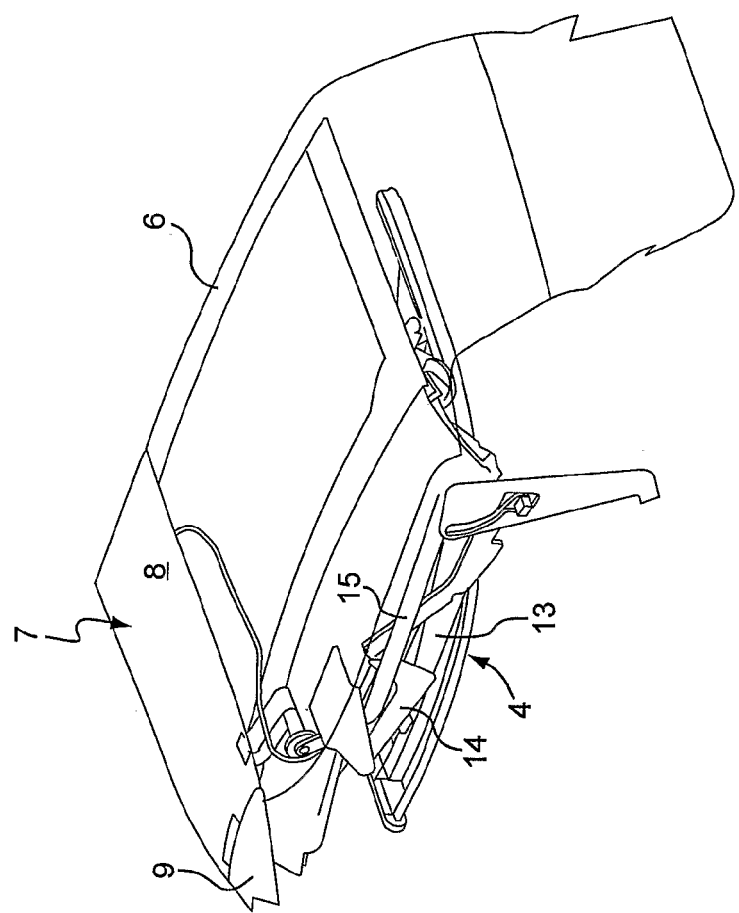
Fig. 14

CONVERTIBLE WITH A ROOF WHICH CAN BE STORED BELOW A COVERING

REFERENCE TO RELATED APPLICATIONS

This application is the United States national phase application of Patent Cooperation Treaty No. PCT/DE06/00981, filed Jun. 7, 2006, which claims priority from German patent application No. DE102005026281.3, filed Jun. 8, 2005, the entire content of both of which is incorporated herein by reference.

FIELD OF THE INVENTION

The present invention relates to a convertible vehicle with a roof which can be stowed below a cover, which is movable in two opening senses, in the rearward vehicle region.

BACKGROUND OF THE INVENTION

In order to stow a roof under a movable shelf or cover, it is known to provide an extension for the cover. The cover extension covers and visually terminates the space between the front edge of the cover and the passenger compartment when the roof is open.

DE 199 43 860 B4 shows a cover element that can be moved upwardly in two directions and a plate-like extension is held under the cover and can be pivoted forwardly to extend the cover forwardly to be flush when the roof is open. The assembled cover assembly has a very large longitudinal extension, which can be problematic with specific vehicle geometries. The width of the extension must be adapted to the width of the cover for a pleasing appearance with such a design.

SUMMARY OF THE INVENTION

The present invention provides a convertible vehicle with a vehicle body having a passenger compartment and a rearward storage region defined therein. A roof is movable between a closed position extending over the passenger compartment and an opened position wherein the roof is stowed in the rearward storage region. A movable cover has a closed position wherein the cover covers the rearward storage area and is movable to a first opened position to provide a passage opening for the roof and to a second opened position to provide a loading opening for baggage. A cover extension has an extended position wherein the cover extension at least partially covers an opening between the movable cover and the passenger compartment when the roof and the cover are both in the closed position. The cover extension is movable with the cover when the cover moves to the first opened. The cover extension does not move with the cover when the cover moves to the second opened position.

In accordance with the invention, the size of the assembly to be moved when trunk is opened is reduced since only the cover has to be moved. The cover extension is disposed flush in front of the cover when the roof is open and does not move when the trunk is opened. Therefore, only a smaller and lighter part has to be moved. The width of the cover extension can be selected independently of the width of the cover, whereby the flexibility in design is substantially expanded.

It is in particular advantageous if the extension is not attached to the cover itself, but rather is interconnected with lateral linkage assemblies. The lateral linkage assemblies are arranged below the plane of the cover and are movable with the cover to the first opened position to provide the passage opening for the roof. The lateral linkage assemblies remain in a rest position when the cover moves to the second opened position to provide the loading opening for baggage. The co-movement of the cover extension with the cover thus results without any further control or drive measures when the cover pivots open to provide the passage opening for the roof, whereas the cover extension remains in a substantially horizontal position of rest when the cover opens in the opposite direction to provide trunk access.

The linkage assemblies may be disposed laterally and longitudinally in the vehicle to provide a simple construction and to save space. In some embodiments, the linkage assemblies are multi-bar linkage assemblies, for example five-bar linkages or seven-bar linkages.

Such multi-bar linkage kinematic systems can advantageously be provided in which at least one pivot is locked for each opening direction. A different pivot may be locked depending on the opening direction. The linkage assembly can also form side parts of an auxiliary frame disposed longitudinally in the vehicle, with this auxiliary frame extending side to side via a transverse pipe, for example.

In some embodiments, the cover extension includes a middle part, with respect to the transverse direction of the vehicle, and laterally disposed side wings. These side parts are folded inwardly with respect to the middle part into a downwardly facing storage position when the roof is closed. As such, the cover extension may have a narrow width but be extendable to a wider width. This may be used in association with a narrowing of the roof during its opening movement.

The invention can in particular be combined with a vehicle which includes rigid roof parts and roof pillars which are disposed to the side of the rear window and can be pivoted inwardly around axes disposed at least substantially parallel to the side edges of the back window during the roof opening. As such the roof narrows during its opening movement and the cover can be narrower than the closed roof. The cover extension arranged to the front can nevertheless have a greater width with respect to the cover and thus also visually terminate sides between the passenger compartment and the cover which are disposed further outwardly with respect to the cover. The width of the cover can nevertheless be kept small in an optically elegant manner.

BRIEF DESCRIPTION OF THE DRAWINGS

Advantages of the present invention will be readily appreciated as the same becomes better understood by reference to the following detailed description when considered in connection with the accompanying drawings.

FIG. 3 is a view similar to FIG. 2 with the roof closed and with the cover pivoted open to provide a passage opening for the roof and with the cover extension pivoted inwardly under the cover;

FIG. 4 is a view similar to FIG. 3 during the beginning of the opening process with the cover extension beginning to pivot outwardly;

FIG. 5 is a view similar to FIG. 4 with the roof opened further and the cover extension pivoted further outwardly;

FIG. 13 is a view similar to FIG. 12 with the roof opened further;

FIG. 14 is a view similar to FIG. 9 with the roof completely opened and the cover closed above it, in approximately the same position as in FIG. 7;

DETAILED DESCRIPTION OF THE INVENTION

Figure 1:
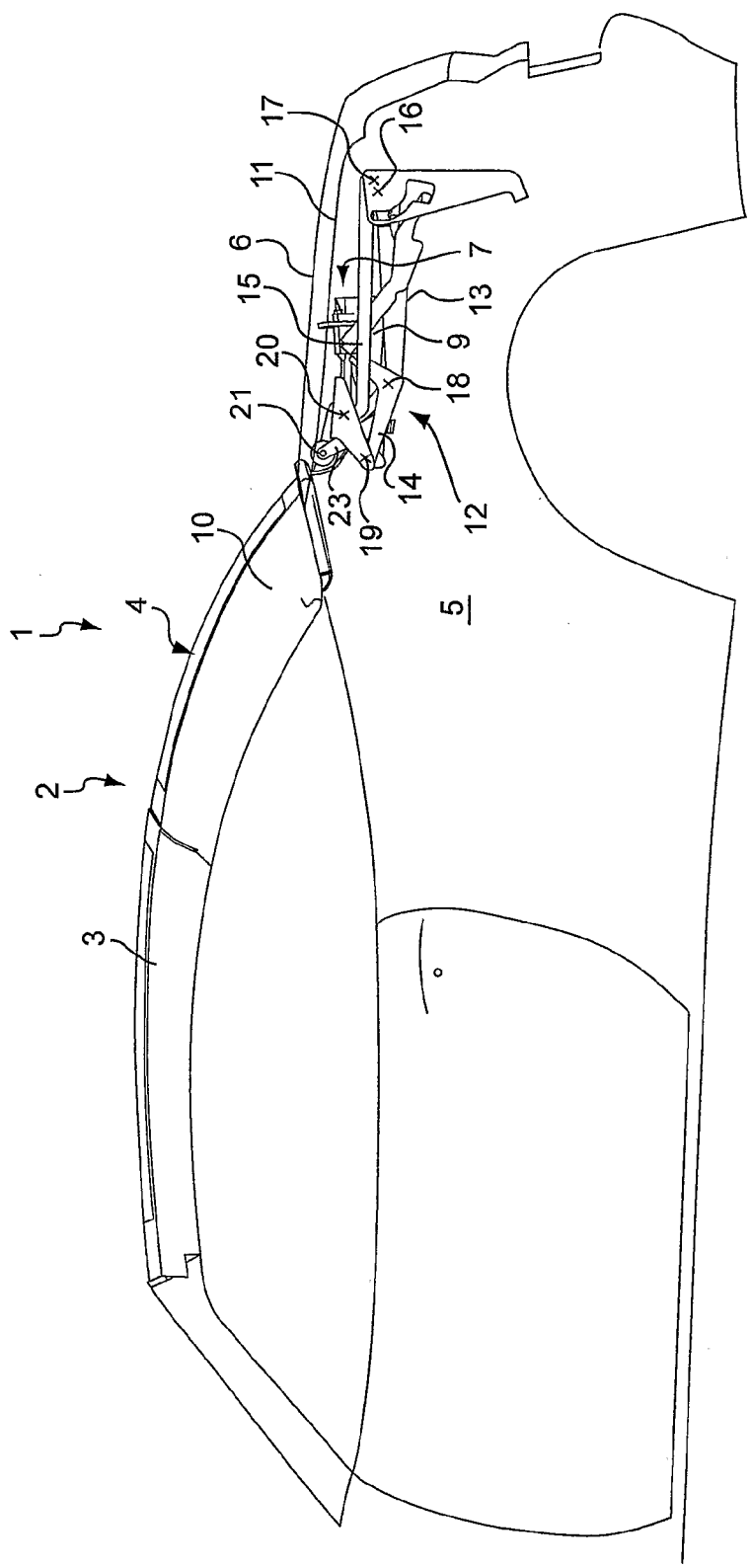
FIG. 1 is a schematic side view of a convertible vehicle in accordance with the invention, with the front part of the vehicle not shown, and with the roof and the rear cover both closed.

A convertible vehicle 1, shown only partly in the drawings, includes a movable roof 2 which, in the illustrated embodiment, includes a plurality of rigid roof parts 3, 4. Alternatively, the roof parts are not required to be rigid. In its open state, the roof can be stowed in a rearward body region. In the illustrated embodiment, a movable cover 6 covers a large portion of upper side of the body 2 at the rear of the vehicle 1 and acts in combination as a top storage well cover and as a trunk lid.

The cover 6 can be opened rearwardly in a first direction to provide a passage opening for the roof (FIG. 3 to FIG. 6) and forwardly in a second direction to provide a loading opening for baggage (FIG. 15 to FIG. 18).

With the roof closed, the front edge of the cover 6 extends approximately up to the rearward edge of the rearmost roof part 4. A movable parcel shelf may also be provided to cover a region which extends from the rearmost roof part 4 forwardly up to the backrest of a rear bench, for example, or to a similar passenger compartment boundary, when the roof 2 is closed.

A cover extension 7 is provided to cover the region between the cover and the passenger compartment when the roof 2 is in the opened position and lowered into the body 5. The cover extension 7 is associated with the movable cover 6 and may be held below the movable cover when the roof is closed. However, the association between the cover extension 7 and the movable cover does not mean that the cover extension 7 is attached to the movable cover 6.

Figure 8:
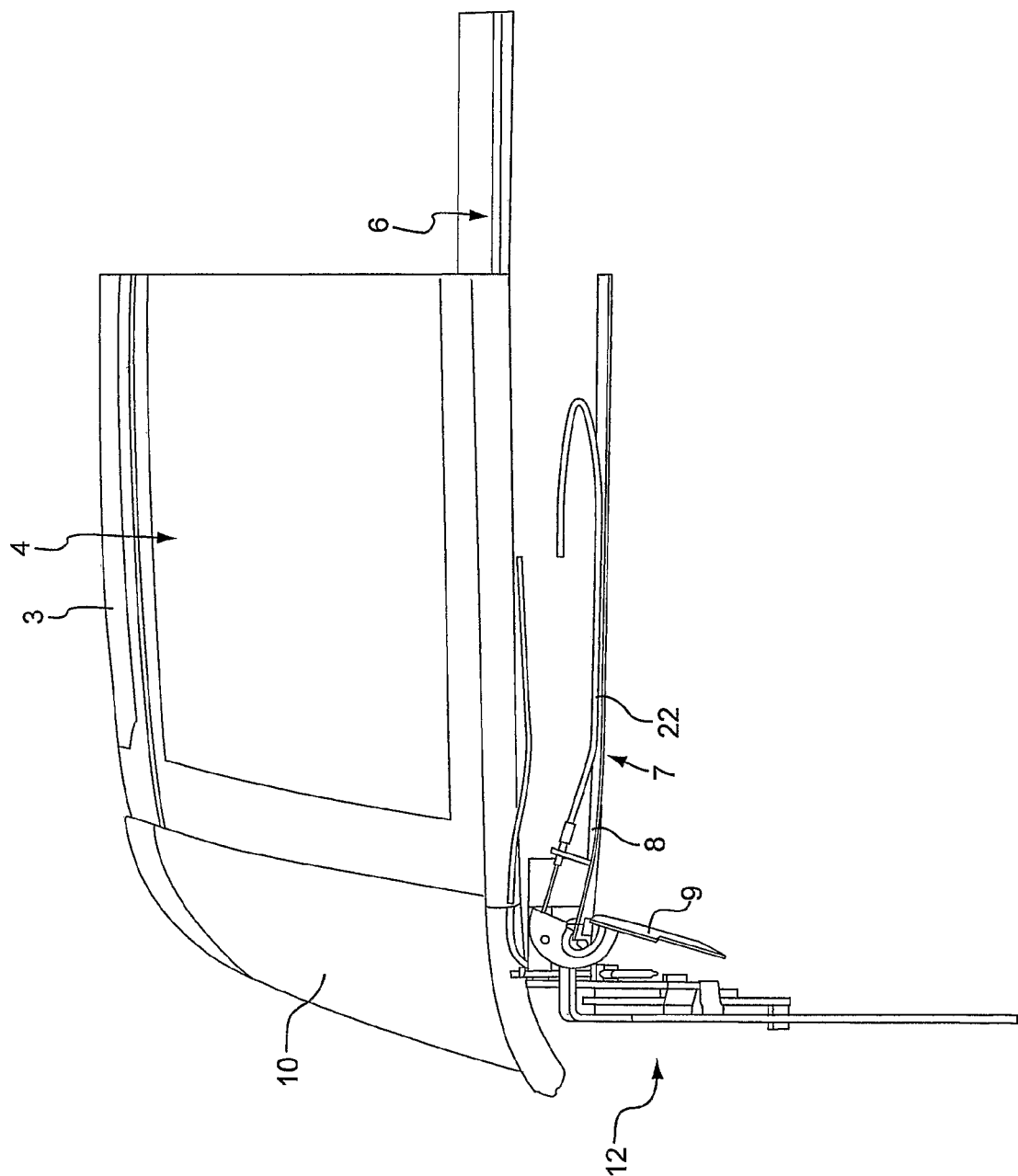
FIG. 8 is a view from the rear of the roof and the cover closed in the position of FIG. 2.
Figure 9:
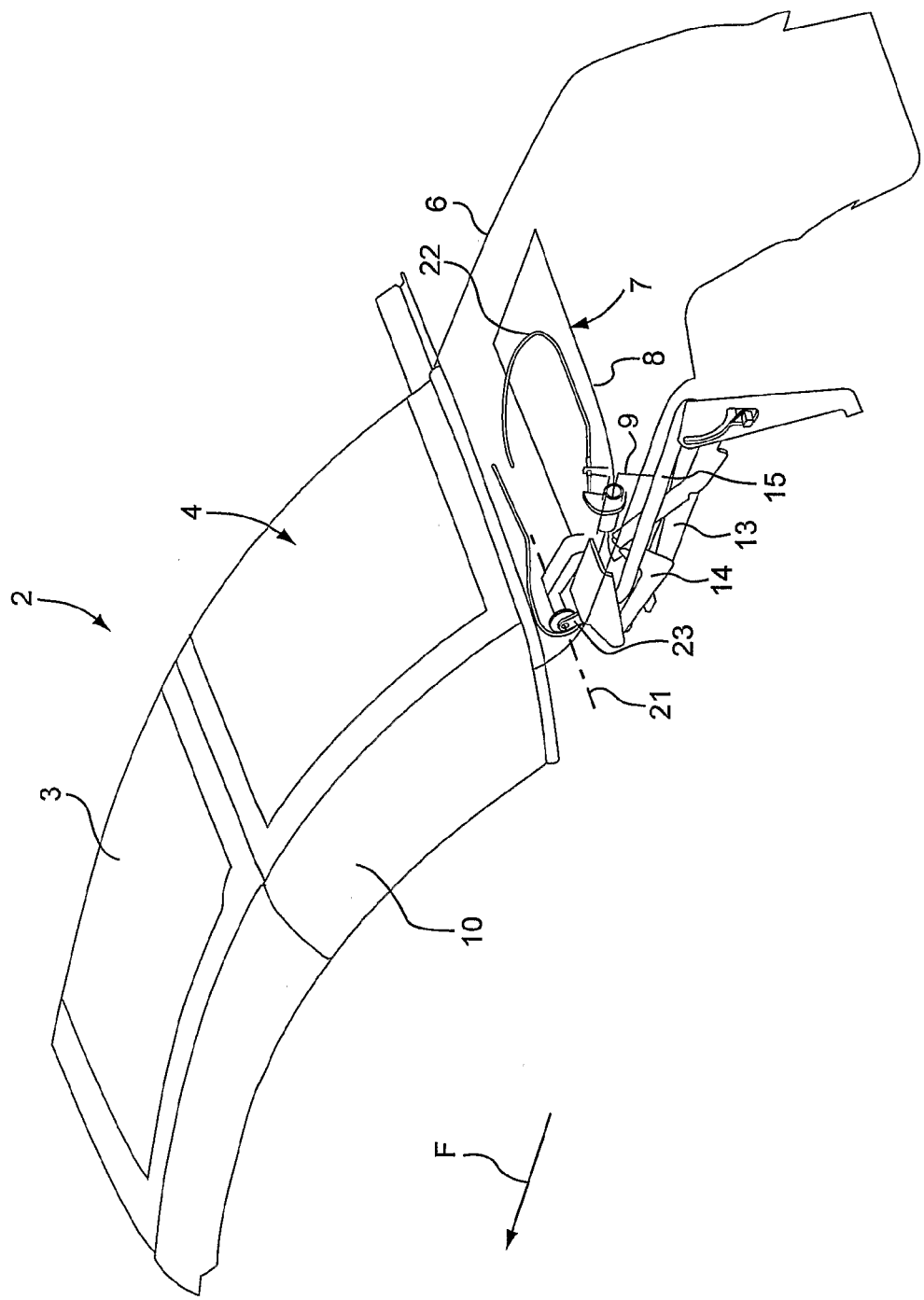
FIG. 9 is a perspective view of the vehicle obliquely from the rear with the roof and the cover closed, with the cover drawn in transparent fashion.
Figure 10:
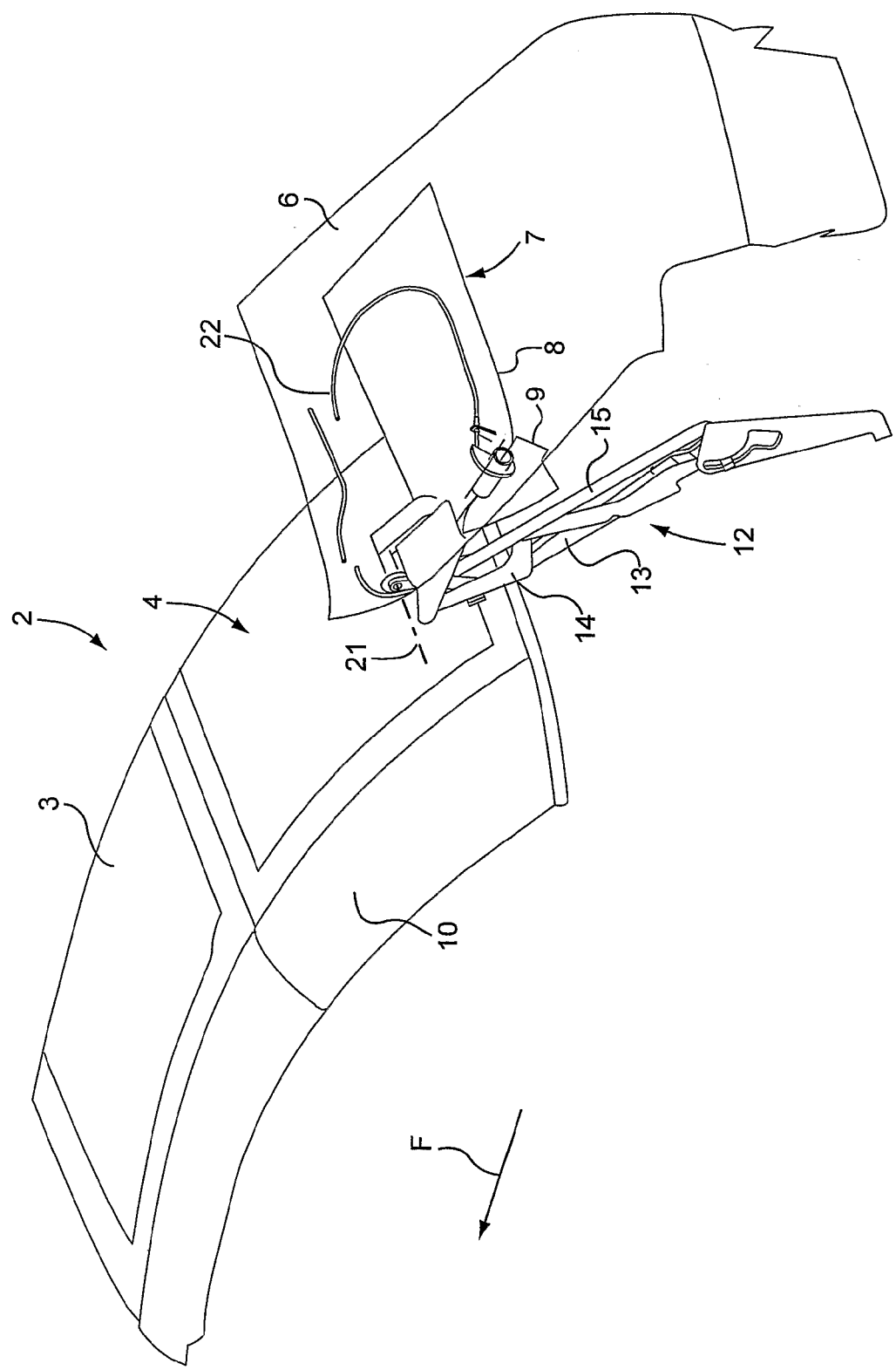
FIG. 10 is a view similar to FIG. 9 with the roof and cover in approximately the same position as in FIG. 3.

In the illustrated embodiment, the cover extension 7 is made from a lightweight material such as plastic or of a metallic foamed material. The cover extension is made in multiple parts and includes a middle part 8, with respect to the transverse direction of the vehicle, and side wings which can be pivoted inwardly and outwardly with respect to the middle part. These side wings project substantially vertically downwardly when the roof 2 and movable cover 6 are both closed (FIG. 8) and are disposed flush next to the middle part 8 when the roof is open and the movable cover 6 is closed. A space can thereby be covered by the cover extension 7 which is considerably wider than the movable cover 6. The surface of the cover extension 7 can be painted in the color of the vehicle and can be weatherproof and thus harmoniously match the body 5 and the cover 6.

Figure 11:
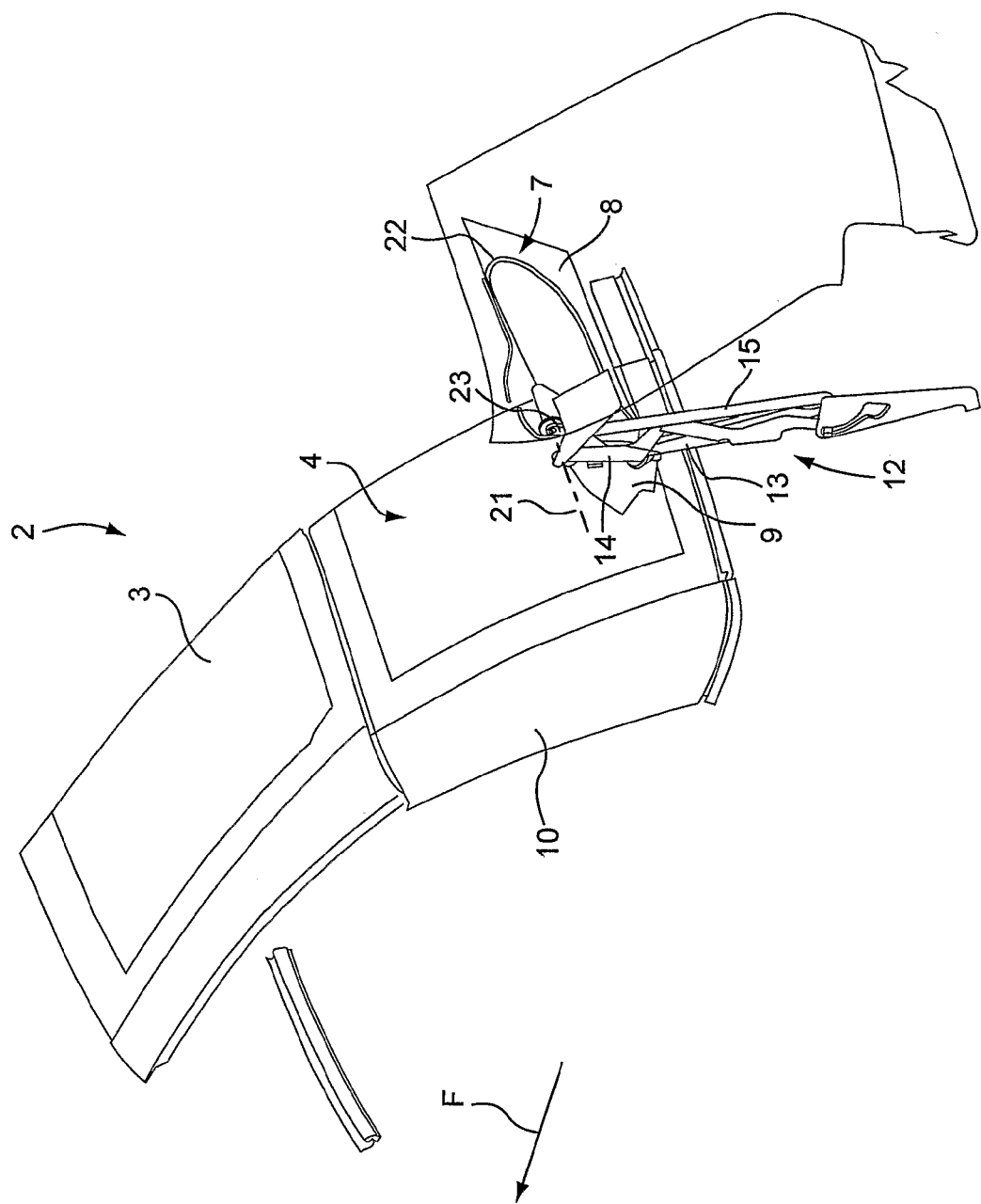
FIG. 11 is a view similar to FIG. 9 with the roof and cover in approximately the same position as in FIG. 4.
Figure 12:
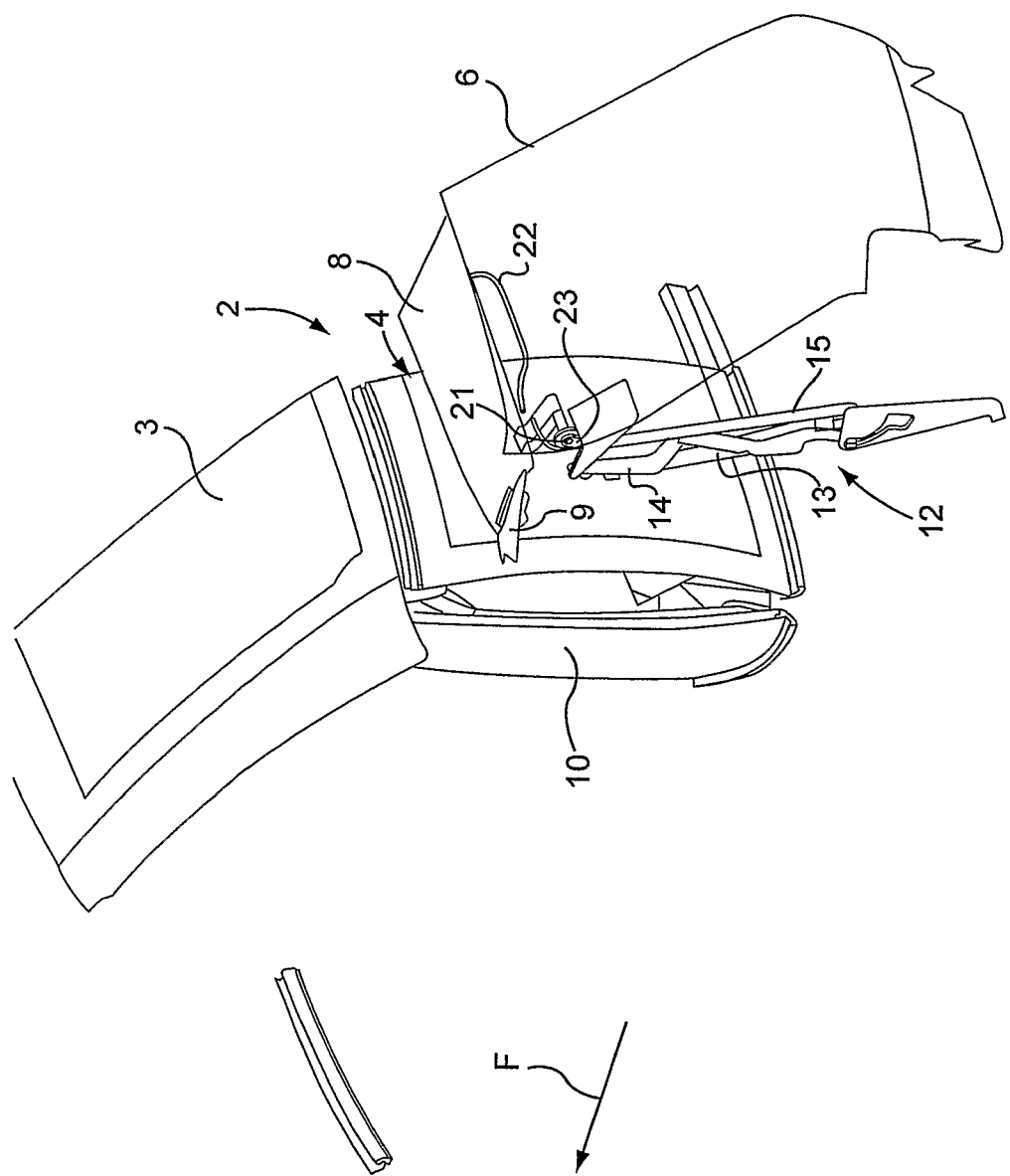
FIG. 12 is a view similar to FIG. 9 with the roof and cover in approximately the same position as in FIG. 5.

The cover 6 can itself be made narrower than the cover extension 7, especially when the rearmost roof part 4 includes lateral pillars 10, frequently also called C pillars, which pivot inwardly around an axis disposed parallel to the side edges of the rear window during the opening of the roof (FIG. 11 to FIG. 13) and thereby make the opened roof 2 narrower overall with respect to its closed version. As is visible in FIG. 16, for example, the side joint 11 between the body and the cover 6 can be considerably higher than with customary convertible vehicles, which opens up new and advantageous design options. The width of the closed rear roof part 4 can extend beyond the width of the cover 6 with this approach. The cover extension 7 with the side wings pivoted out is thereby also wider than the cover 6.

The cover extension 7 is not directly connected to the cover 6, but is rather attached to lateral linkage assemblies 12. These linkage assemblies each include links 13, 14, 15 to move the cover 6. These links are moved differently depending on the direction the movable cover 6 is opened. The linkage assembly 12 can form laterally longitudinally forwardly projecting limbs of an auxiliary U-shaped frame in a plan view. They can also form a multi-bar linkage arrangement with, for example, seven or more bars.

A linkage assembly 12 having a five-bar linkage design is shown by way of example in the illustrated embodiment. The links 13, 15 are pivotably connected to the vehicle body at two pivot points 16, 17 fixed to the vehicle body. Link 15 is hingedly connected to the cover 6 at pivot point 20. A further link 14 is hingedly connected to the cover 6 at pivot point 19 and is hingedly connected to the link 13 at pivot point 18.

When the cover 6 is opened in the first direction to provide the passage opening for the roof (FIG. 3), the pivot point 18 is locked, both on the closing of the roof and on the opening of the roof, so that the links 13 and 14 do not pivot with respect to one another and an active four-bar linkage 15, 17, 19, 20 is formed overall.

Figure 18:
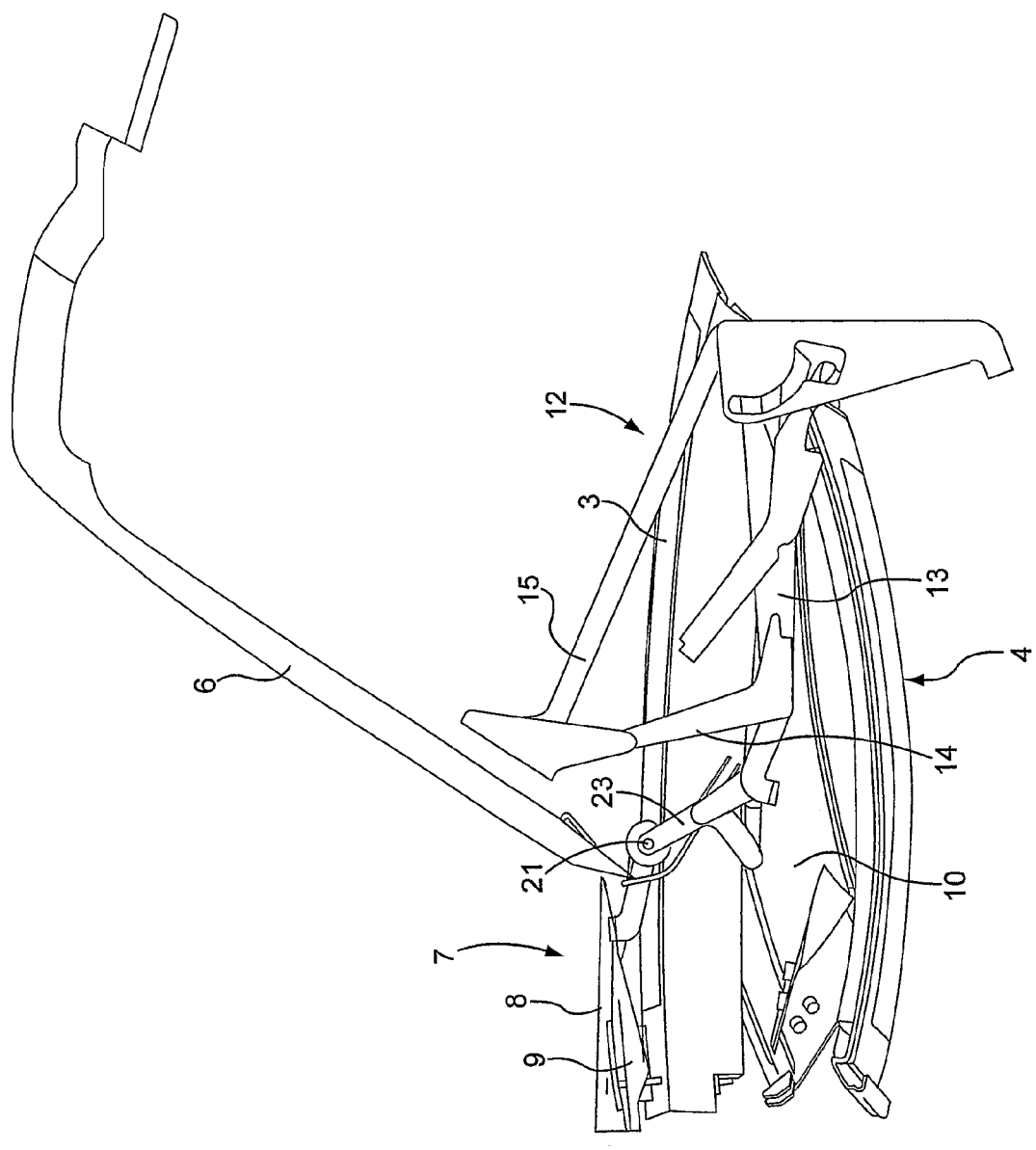
FIG. 18 a side view with the roof stowed and the cover opened above it for the release of the trunk opening in the position of FIG. 17.

When the cover 6 is opened in the second direction to receive baggage, another pivot point, namely pivot point 16, is locked such that the link 13 remains at rest and only the link 14 pivots at the pivot point 18. Another active four-bar linkage 17, 18, 19, 20 is thus formed (FIG. 18).

Figure 17:
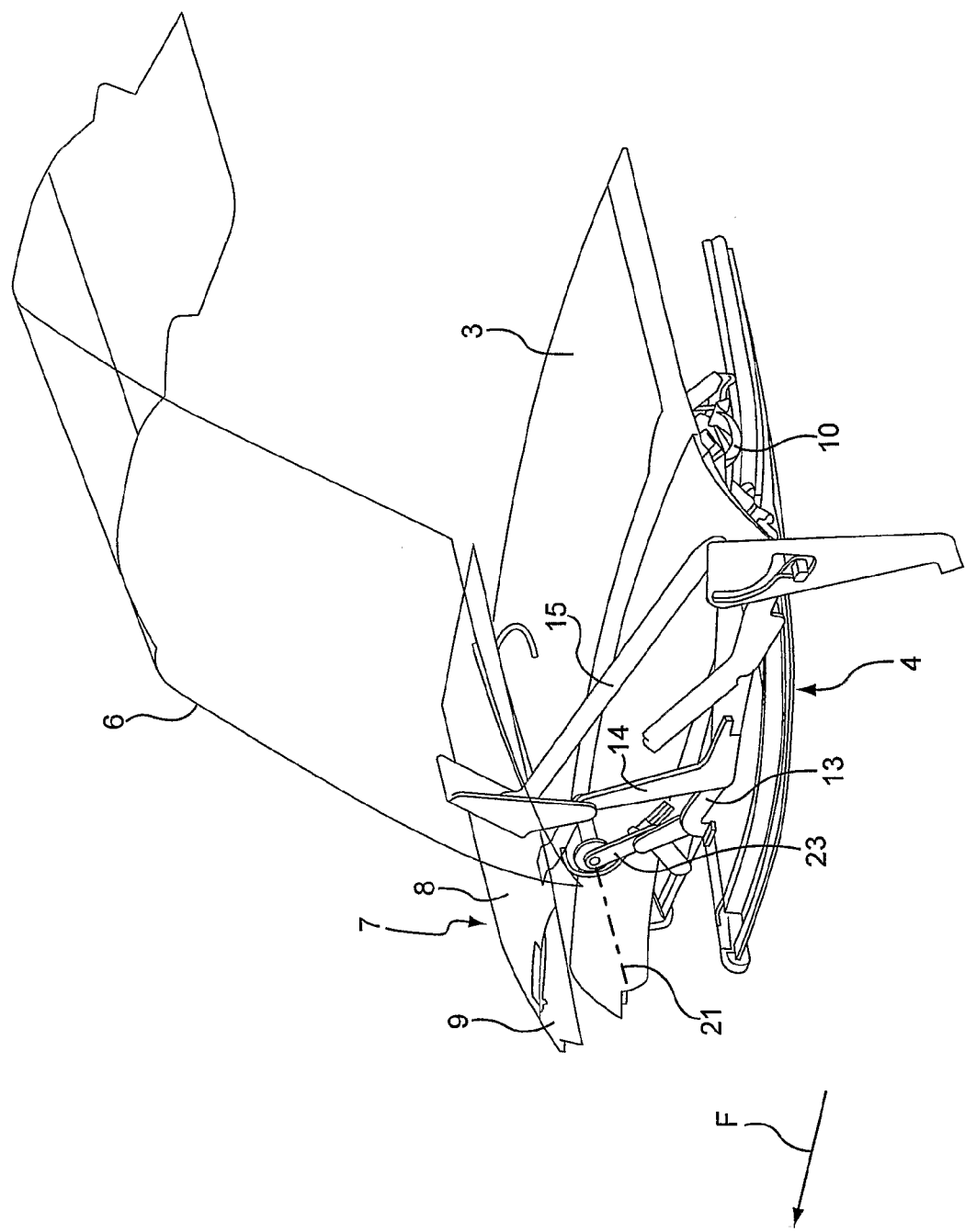
FIG. 17 is a view similar to FIG. 16, but with the roof stowed and the cover extension disposed substantially horizontally in front of the cover.

The cover extension 7 is pivotable with respect to the linkage assembly 12 around an axis 21 extending horizontally and transversely to the vehicle body. The axis 21 is connected via a cantilever 23 to the link 13. Provided the link 13 remains at rest (opening of the trunk: FIG. 17, FIG. 18), the axis 21 and thus the cover extension 7 also remains unmoved.

Figure 2:
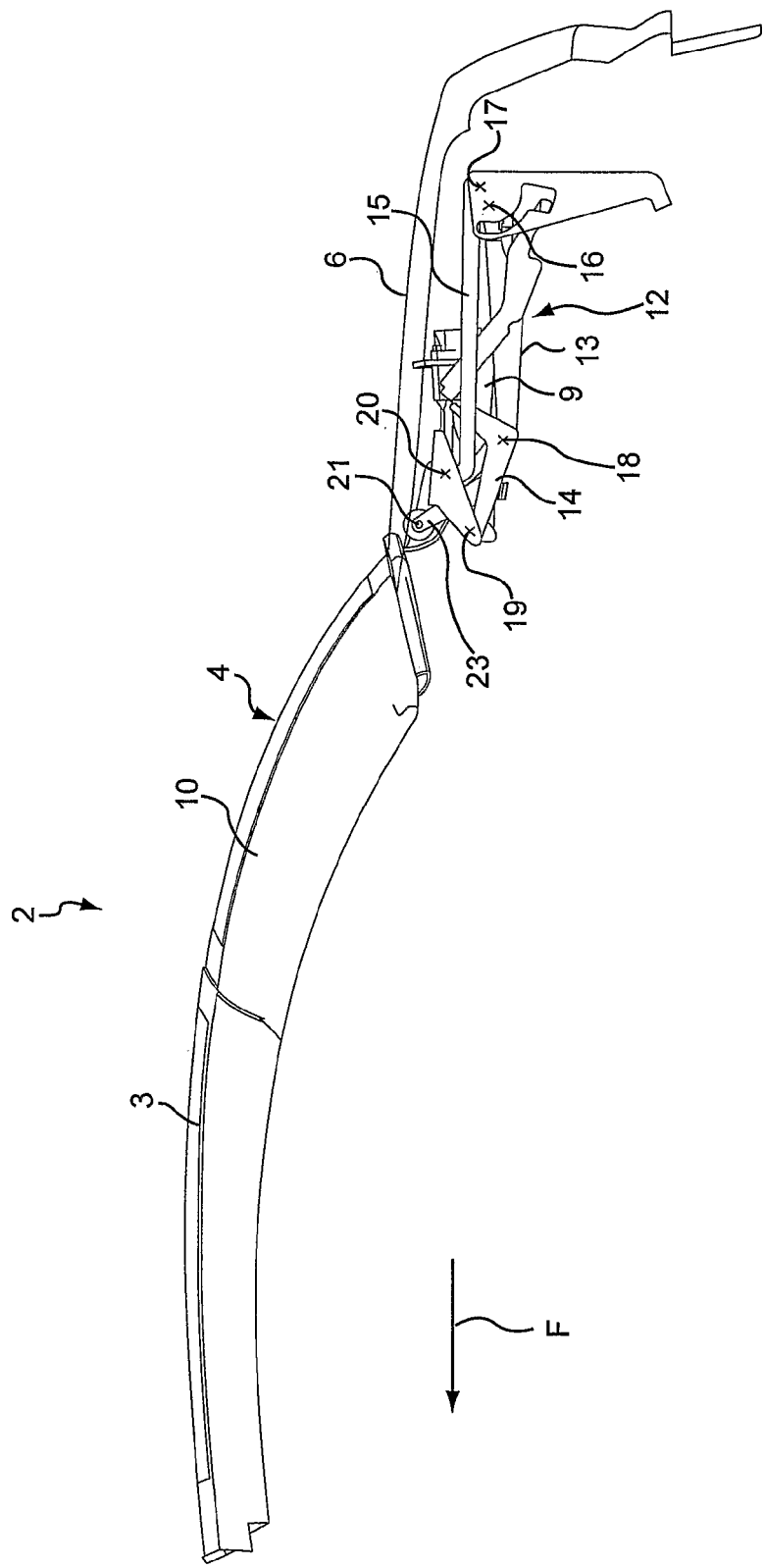
FIG. 2 is a partial view of the roof and of the cover in the same position as FIG. 1.
Figure 6:
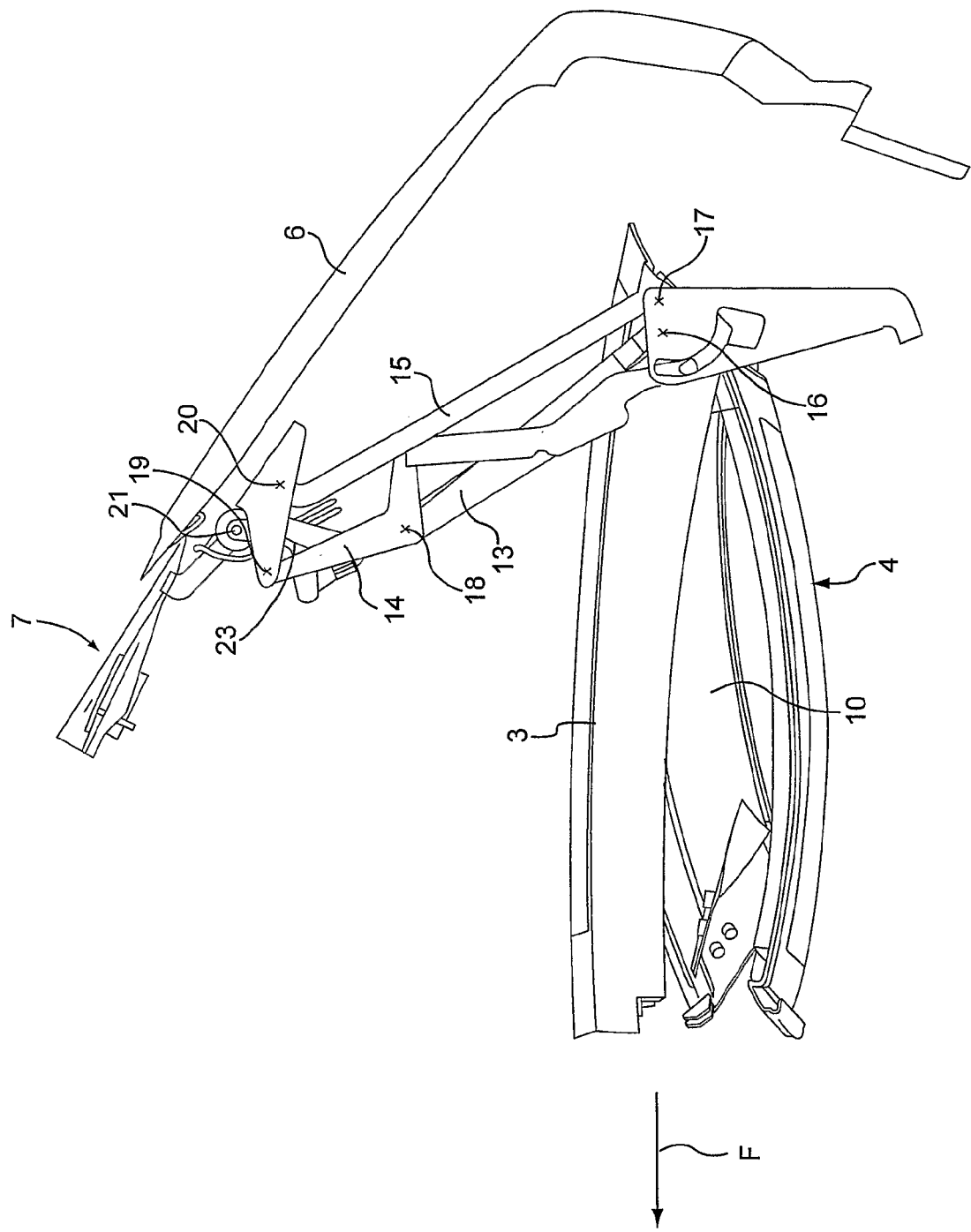
FIG. 6 is a view similar to FIG. 5 with the roof completely open and the cover extension pivoted outwardly.
Figure 7:
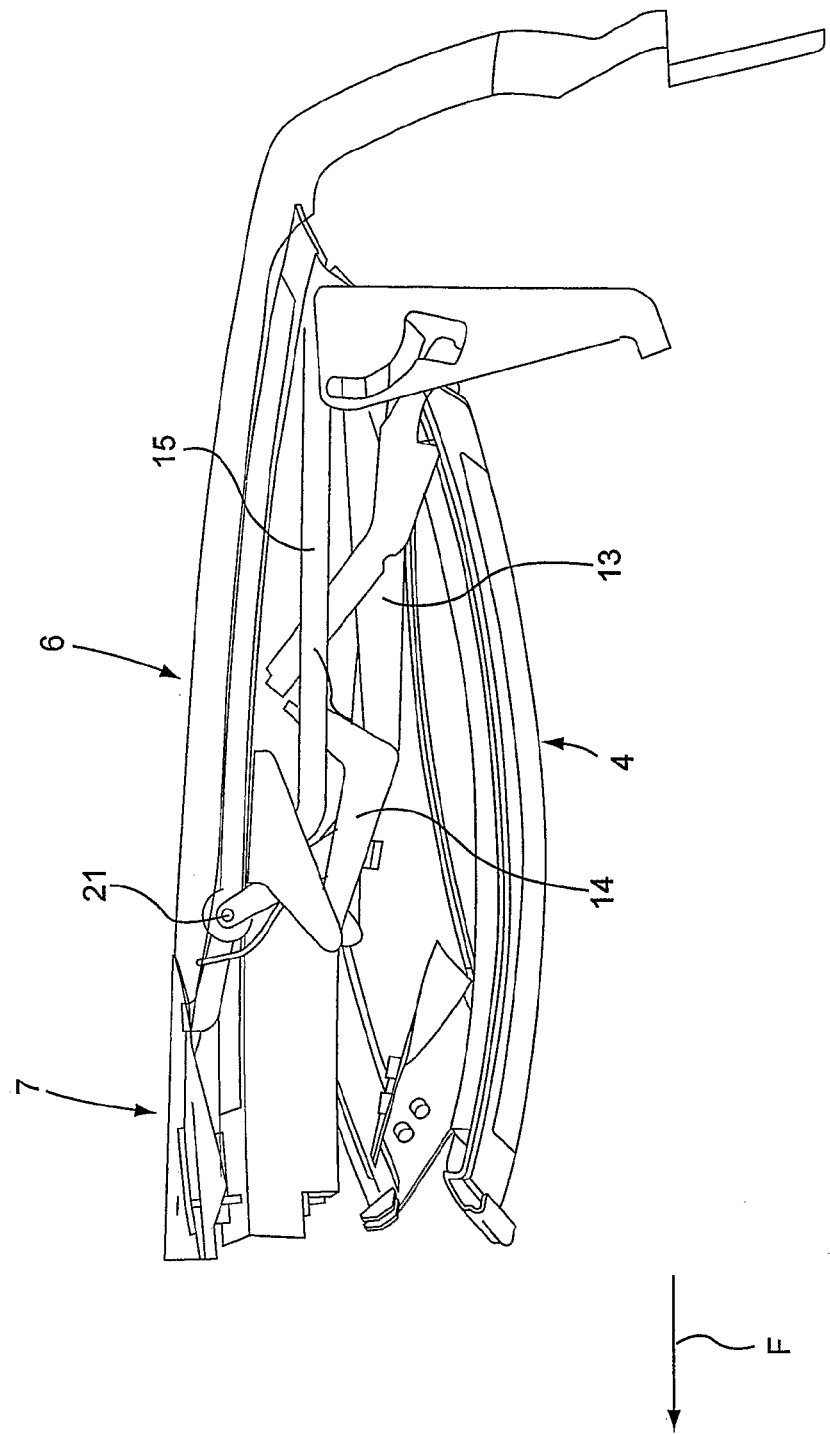
FIG. 7 is a view similar to FIG. 6 with the roof completely open and with the cover and outwardly pivoted extension closed over the roof.

With a roof 2 and the cover 6 both closed FIG. 2), the cover extension is pivoted inwardly to a retracted position below the cover 6, with the upper side downward. The cover extension 7 moves along with the cover 6 when the cover 6 moves to the first opened position to provide the passage opening for the roof, with the cover extension 7 and cover 6 in an unchanging relative position FIG. 3). Only by the opening of the roof 2 about the axis 21 is the extension pivoted outwardly, for example via Bowden cables or other coupling means (procedure from FIG. 3 to FIG. 7), with a separate drive or control means being able to be dispensed with.

At the same time, or slightly offset in time, depending on the desired procedure, the side wings 9, which face downwardly in the position of rest, pivot outwardly. The side wings 9 pivot outwardly around longitudinal axes against a spring force with the help of a Bowden cable 22. No additional drive or control effort is required for the inward or outward pivoting of the side wings 9.

As an alternative to the illustrated embodiment, depending on the design of the vehicle 1, it may be desirable to avoid very long Bowden cables and to provide a separate drive, for example an electric motor or a hydraulic drive, for the outward pivoting of the cover extension 7 and of the side wings 9. With this approach, the cover extension can pivot completely outwardly without and the side parts 9 can fold outwardly with respect to the middle part 8, for example when the roof is closed and the cover is open as shown in FIG. 3.

With the roof fully opened, the cover extension 7 is opened together with the cover 6 due to the cover extension 7*being* attached to the linkage assembly 12. When the roof 2 is open and the cover 6 is closed, the cover extension 7 is disposed flush in front of the cover 6 and is extended to its full width.

The cover 6 can be opened from this position to provide a loading opening (FIG. 17) without the cover extension 7 being moved therewith. Instead, the cover extension 7 remains in its substantially horizontal covering position similar to when the cover 6 is closed (FIG. 77 FIG. 14).

Figure 15:
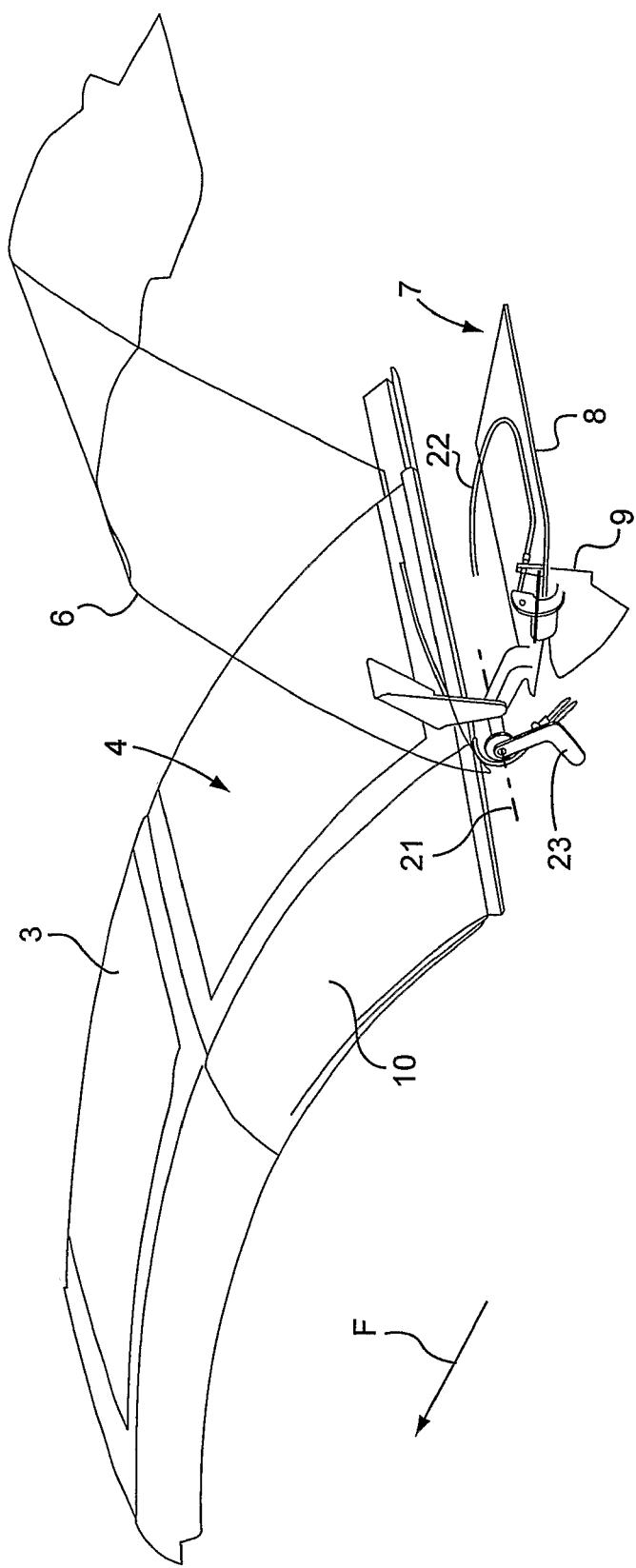
FIG. 15 is a view similar to FIG. 14 with the cover opened for the release of a loading opening for baggage.
Figure 16:
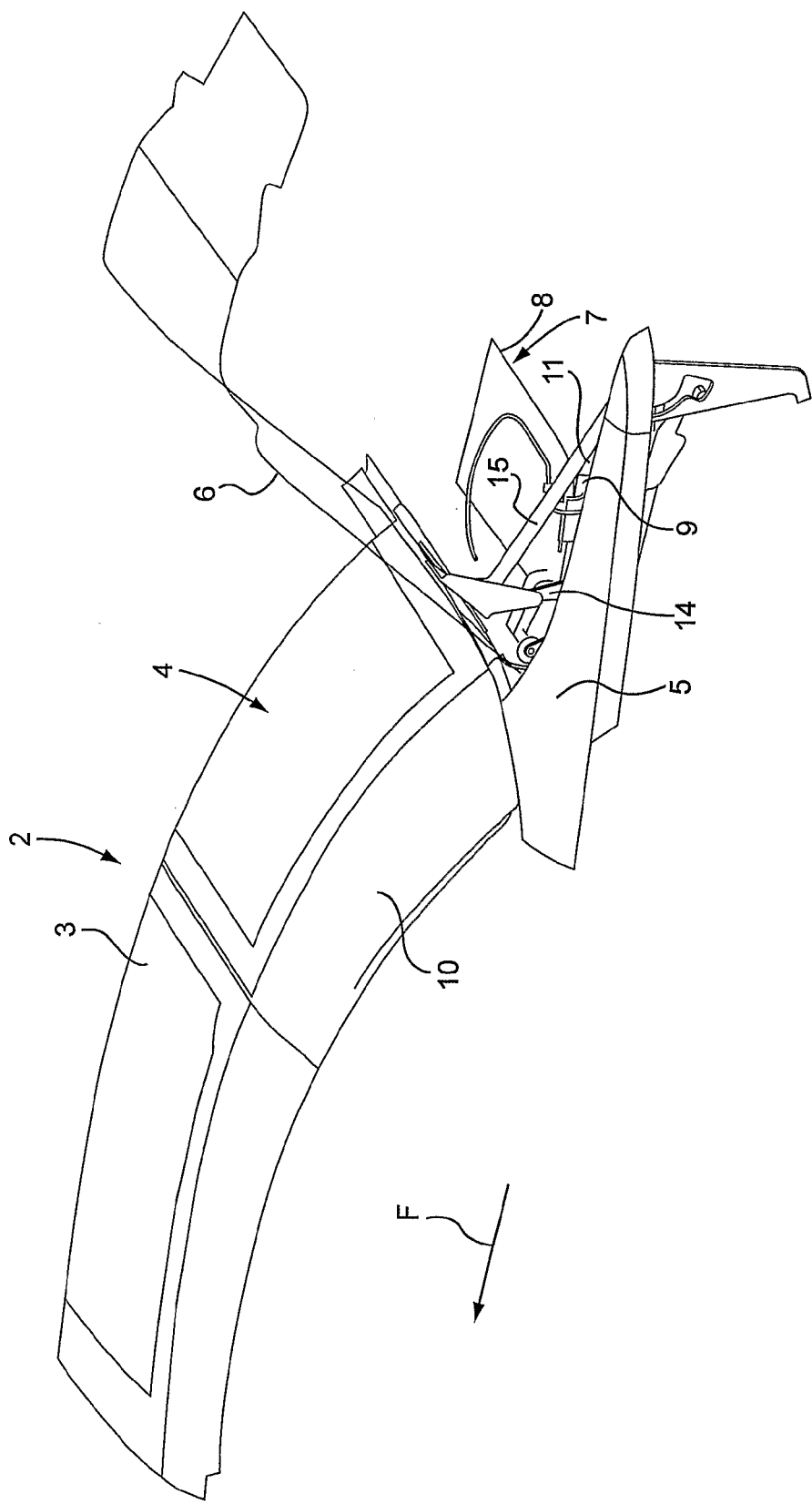
FIG. 16 is a view similar to FIG. 15 with an upper side part illustrated.

The cover 6 can also be opened for the release of the trunk FIG. 15, FIG. 16) with the roof 2 closed, when the cover extension 7 is flipped over and disposed below the cover 6 FIG. 2), without the cover extension having to be moved. This is, however, not compulsory. A co-movement of the cover extension 7 and the inwardly pivoted side wings 9 would also be possible. The control effort is, however, minimized where the cover extension 7 automatically follows the position of the link 13 of the lateral linkage assembly 12. In addition, a lower expenditure of force is required since only the cover 6, without the cover extension 7, needs to be opened.

It is also not compulsory for the cover extension 7 to be flipped over under the cover 6. The extension could remain in the same orientation with respect to its position disposed flush in front of the cover 6.

It is understood that the roof shape and the vehicle size can be made differently. For example, the convertible vehicle 1 can be either a two-seater or a convertible vehicle with a larger passenger compartment and, for instance, two rows of seats behind one another.

The aforesaid special features with respect to the narrow cover 6 and the cover extension 7 which is wider with respect thereto occur in particular with roof parts 3, 4 having C-pillars 10 that can be pivoted inwardly so that the invention again shows special advantages.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A convertible vehicle comprising:
   a vehicle body having a passenger compartment and a rearward storage region defined therein;
   a roof movable between a closed position extending over the passenger compartment and an opened position wherein the roof is stowed in the rearward storage region;
   a movable cover having a closed position wherein the cover covers the rearward storage area, the cover being movable to a first opened position to provide a passage opening for the roof and being movable to a second opened position to provide a loading opening for baggage; and
   a cover extension having an extended position wherein the cover extension at least partially covers an opening between the movable cover and the passenger compartment when the roof and the cover are both in the closed position, the cover extension being movable with the cover when the cover moves to the first opened, the cover extension not moving with the cover when the cover moves to the second opened position.

2. A convertible vehicle according to claim 1, further comprising a lateral linkage assembly supporting the movable cover, the lateral linkage assembly moving with the movable cover when the movable cover is moved from the closed position to the first opened position, the linkage assembly remaining in a rest position when the movable cover is moved from the closed position to the second opened position;
   wherein the cover extension is interconnected with the lateral linkage assembly.

3. A convertible vehicle according to claim 2, wherein the lateral linkage assembly comprises a multi-bar linkage assembly having multiple pivots.

4. A convertible vehicle according to claim 3, wherein at least one pivot of the multi-bar linkage assembly is locked when the movable cover is moved to each of the opened positions.

5. A convertible vehicle according to claim 4, wherein a different pivot of the multi-bar linkage locked when the cover is moved to each of the opened positions.

6. A convertible vehicle according to claim 1, wherein the cover extension has a middle part and laterally disposed side wings which are folded inwardly with respect to the middle part into a downwardly facing storage position when the roof is in the closed position.

7. A convertible vehicle according to claim 6, wherein the inward folding of the side wings is driven by the movement of the roof such that a separate drive is not provided.

8. A convertible vehicle according to claim 6, wherein the side wings are hingedly connected to the middle part and are spring biased.

9. A convertible vehicle according to claim 1, wherein the roof has a rearmost roof part having lateral pillars, the pillars being pivotally movable inwardly when the roof is moved to the opened position.

10. A convertible vehicle according to claim 1, further comprising a lateral linkage assembly movably supporting the cover, the cover extension being interconnected with the lateral linkage assembly.

* * * * *

UNITED STATES PATENT AND TRADEMARK OFFICE
CERTIFICATE OF CORRECTION

PATENT NO. : 7,686,377 B2
APPLICATION NO. : 11/916828
DATED : March 30, 3010
INVENTOR(S) : Franz Ulrich Brockhoff It is certified that error appears in the above-identified patent and that said Letters Patent is hereby corrected as shown below:

Column 5, line 27 - delete "77" and insert --7--

Signed and Sealed this

Seventh Day of December, 2010

David J. Kappos
*Director of the United States Patent and Trademark Office*